US010929714B2

(12) United States Patent
Soltani Bozchalooi et al.

(10) Patent No.: US 10,929,714 B2
(45) Date of Patent: Feb. 23, 2021

(54) HIGH-THROUGHPUT AUTOMATED ANNOTATION OF VISUAL DATA FOR TRAINING NEURAL NETWORKS USED FOR LANDMARK DETECTION

(71) Applicant: Ford Global Technologies, LLC, Dearborn, MI (US)

(72) Inventors: Iman Soltani Bozchalooi, Sacramento, CA (US); Francis Assadian, Davis, CA (US)

(73) Assignee: Ford Global Technologies, LLC, Dearborn, MI (US)

( * ) Notice: Subject to any disclaimer, the term of this patent is extended or adjusted under 35 U.S.C. 154(b) by 103 days.

(21) Appl. No.: 16/195,188

(22) Filed: Nov. 19, 2018

(65) Prior Publication Data

US 2020/0160107 A1 May 21, 2020

(51) Int. Cl.
*G06K 9/62* (2006.01)
*G06K 9/46* (2006.01)
*G06N 3/08* (2006.01)

(52) U.S. Cl.
CPC ......... *G06K 9/6256* (2013.01); *G06K 9/4652* (2013.01); *G06K 9/4661* (2013.01); *G06N 3/08* (2013.01)

(58) Field of Classification Search
CPC ... G06K 9/6256; G06K 9/4652; G06K 9/4661
See application file for complete search history.

(56) References Cited

U.S. PATENT DOCUMENTS

| | | | | |
|---|---|---|---|---|
| 8,897,550 | B2 | 11/2014 | Tong et al. | |
| 9,020,235 | B2 | 4/2015 | Krishnan et al. | |
| 9,632,505 | B2 | 4/2017 | Hickerson et al. | |
| 9,721,188 | B2 | 8/2017 | Adam et al. | |
| 2002/0126895 | A1* | 9/2002 | Satoh | G06K 9/4609 382/190 |
| 2010/0272330 | A1 | 10/2010 | Pekar et al. | |
| 2017/0116738 | A1* | 4/2017 | Iida | G01B 11/2522 |
| 2017/0206440 | A1 | 7/2017 | Schrier et al. | |

OTHER PUBLICATIONS

Guo, et al., Automatic Landmark Annotation and Dense Correspondence Registration for 3D Human Facial Images, Published Jul. 22, 2013, available at URL: https://bmcbioinformatics.biomedcentral.com/articles/10.1186/1471-2105-14-232.

* cited by examiner

*Primary Examiner* — Ruiping Li
(74) *Attorney, Agent, or Firm* — Burris Law, PLLC

(57) ABSTRACT

A method of acquiring and processing visual data is provided, which includes: directing a light of a particular color to at least one of the plurality of landmarks on an object to illuminate the at least one of the plurality of landmarks; obtaining a first image of the object when the at least one of the plurality of landmarks on the object is illuminated; and extracting coordinates of the at least one of the plurality of landmarks from the first image.

18 Claims, 3 Drawing Sheets

HIGH-THROUGHPUT AUTOMATED ANNOTATION OF VISUAL DATA FOR TRAINING NEURAL NETWORKS USED FOR LANDMARK DETECTION

FIELD

The present disclosure relates to systems and methods for acquiring and processing visual data, and more particularly to systems and methods for acquiring and processing visual data to obtain coordinates of landmarks on an object.

BACKGROUND

The statements in this section merely provide background information related to the present disclosure and may not constitute prior art.

Visual servoing has been used in automated systems. Visual servoing refers to vision-based robotic control, which uses visual data to perform tasks, such as assembling, delivering or inspecting parts. Landmark detection is at the heart of many automated tasks. Landmark detection uses data captured through a vision system to detect points of interest (i.e., landmarks) on an object, such as a machine component or assembled machine components.

Landmarks may be used in inspection tasks to detect misalignment or poor connections. The locations of various landmarks on a captured image may be compared against measured locations or distances between various landmarks for automatic inspection. For example, when an engine wiring is not properly connected, the locations of the various landmarks on the wires in the captured image may be inconsistent with those on a reference image.

However, it is not easy to obtain position information of the landmarks. It is time consuming and unreliable to design algorithms for extracting position information of the landmarks from the visual data. Deep learning provides a natural platform for landmark detection in various automation tasks. However, machine learning approaches often rely on large quantities of training data. To implement deep learning, hundreds of images need to be manually annotated and marked to identify various landmarks. In some complex applications like assembly of transmission parts, tens or even hundreds of landmarks have to be detected on every single captured image to provide a precise and reliable guidance of the mating parts by a robotic manipulator. Annotating every single image with several landmarks is a formidable task, making the implementation of deep learning schemes for landmark detection impractical.

The above-mentioned problems and associated needs are addressed in the present disclosure.

SUMMARY

In one form of the present disclosure, a method of acquiring and processing visual data is provided. The method includes: directing a light of a particular color to at least one of the plurality of landmarks on an object to illuminate the at least one of the plurality of landmarks; obtaining a first image of the object when the at least one of the plurality of landmarks on the object is illuminated; and extracting coordinates of the at least one of the plurality of landmarks from the first image.

In other features, the coordinates of the at least one of the plurality of landmarks are extracted from the first image automatically by a coordinates determination module and are obtained based on locations of illumination points on the first image.

The method further includes extracting identity of the at least one of the plurality of landmarks based on a color of light captured on the first image, obtaining a second image of the object right after the at least one of the plurality of landmarks stops being illuminated, separating the first images from the second images by an image separation module, and pairing the coordinates of the at least one of the plurality of landmarks with the second image to form a training dataset. The first images and the second images are captured alternately.

In other features, the plurality of landmarks on the object may be illuminated by a plurality of lights of different colors one by one or simultaneously. Each of the plurality of landmarks is associated with a different color of light. The plurality of lights of different colors may be pulsed lights. The method further includes synchronizing the pulsed lights with a camera trigger that triggers a camera to capture images of the object and moving and adjusting a lighting system to allow the pulsed lights to be directed to corresponding one of the landmarks. The pulsed lights are generated by laser pulsers, which are triggered on every other camera frame capture.

In another form of the present disclosure, a method of acquiring and processing visual data is provided, which includes: directing lights of a plurality of colors to a plurality of landmarks on an object; capturing a first image of the object when each of the plurality of landmarks is illuminated; extracting coordinates of the plurality of landmarks from the first images; and determining identity of each of the landmarks based on the colors of lights being captured on the first images.

It should be noted that the features which are set out individually in the following description can be combined with each other in any technically advantageous manner and set out other variations of the present disclosure. The description additionally characterizes and specifies the present disclosure, in particular in connection with the figures.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
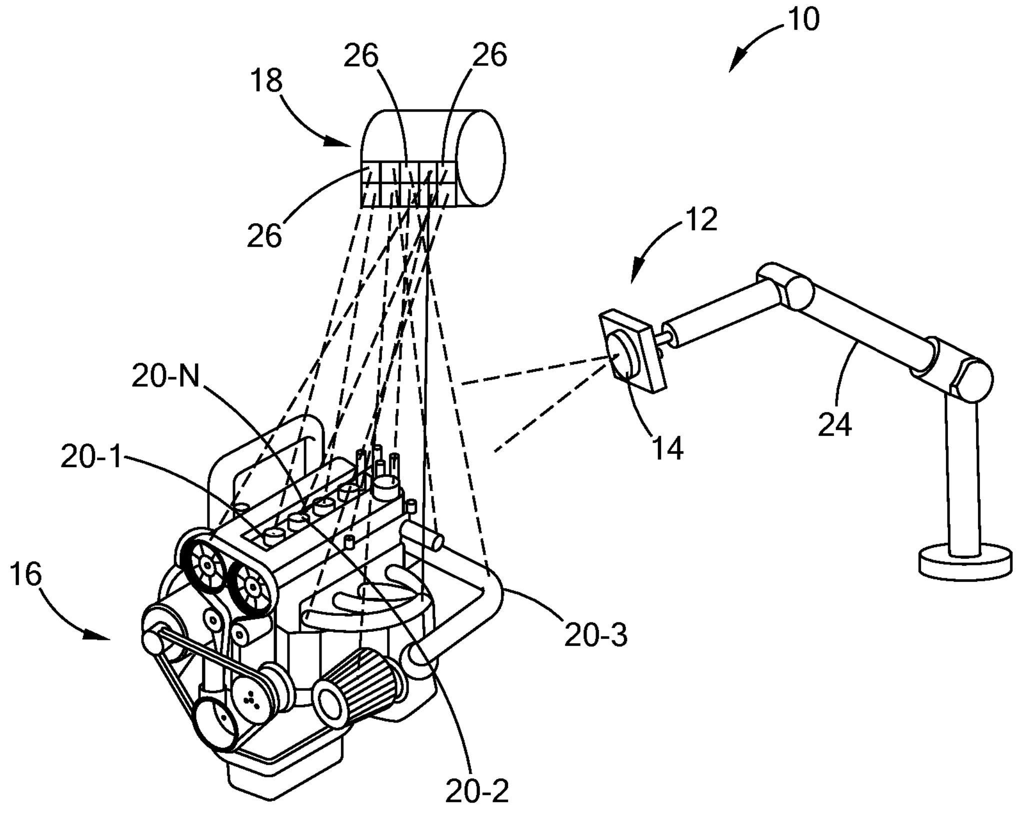
FIG. 1 is a schematic view of a system for acquiring and processing visual data constructed in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

In this application, including the definitions below, the term "module" may be replaced with the term "circuit". The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Referring to FIG. 1, a system 10 for acquiring and processing visual data in accordance with the teachings of the present disclosure includes a vision system 12 including one or more cameras 14 for capturing images of an object 16, a lighting system 18 for illuminating a plurality of landmarks 20-1, 20-2, 20-3, . . . 20-N on the object 16, and a processing module 30 (shown in FIG. 2) for processing the images captured by the camera 14. The object 16 may be a mechanical component, an assembly of multiple mechanical components, or a part of an assembly. In the illustrative example of FIG. 1, the object 16 is an internal combustion engine. The plurality of landmarks 20-1, 20-2, 20-3, . . . 20-N on the object 16 may be a tip of a wire, a corner of an engine cover, a tip/thread of a screw, a main axis of a screw, an edge/center of a mating threaded hole, a tip/connector of a cable, teeth, or an axis of a gear etc.

The vision system 12 is mounted on a movable stage 24 such that the vision system 12 is movable relative to the object 16 and a pose of the camera 14 of the vision system 12 can be adjusted to capture images of the object 16 from various perspectives and to obtain a better view and better images of the plurality of landmarks 20-1, 20-2, 20-3 . . . , 20-N of the object 16. In one form, the movable stage 24 may be a robotic arm having multiple degrees of freedom. While not shown in the drawings, it is understood that the vision system 12 and the lighting system 18 can be mounted on the same robotic arm, as long as the vision system 12 can be moved independently from the lighting system 18 to allow the vision system 12 to capture better images of the plurality of landmarks on the object 16 from different perspectives.

The lighting system 18 is configured to emit lights of different colors/wavelengths. In the exemplary embodiment of FIG. 1, the lighting system 18 may include a multi-beam laser system having a plurality of laser pulsers 26. The plurality of laser pulsers 26 are configured to emit laser beams having different wavelengths (and hence different colors) to the plurality of landmarks 20-1, 20-2, 20-3, . . . 20-N on the object 16. The plurality of laser pulsers 26 emit lights having a plurality of wavelengths/colors corresponding to the plurality of landmarks on the object 16. Therefore, each of the plurality of landmarks 20-1, 20-2, 20-3 . . . 20-N is to be illuminated by a corresponding one of the laser pulsers 26 and marked by a unique color of light from the corresponding laser pulser. The color-coding or laser wavelength of the laser pulser associated with each landmark is predetermined. Therefore, each landmark can be illuminated with a known laser beam of a particular color at desired times. The plurality of landmarks 20-1, 20-2, 20-3 . . . 20-N may be illuminated by lights from the corresponding laser pulsers one by one or simultaneously.

In operation, the lighting system 18 can be properly moved relative to the object 16 and the angle of the laser pulsers 26 relative to the object 16 can be adjusted manually or automatically. As such, the laser beam from one of the laser pulsers 20 can be directed and pointed to the corresponding landmark to illuminate the corresponding landmark. Concurrently, the vision system 12 is moved and the pose of the camera 14 is adjusted such that the corresponding landmark is in the field of view of the camera 14 and such that multiple images of the landmarks of interest from various perspectives can be acquired.

Therefore, a particular landmark is illuminated and marked by the light from the corresponding laser pulser 26 when one or more images of the object 16 are taken. The captured image (i.e., the light-on frame) shows the particular landmark is annotated by a particular color of light. The positional information (i.e., coordinates) of the particular landmark on the object 16 in the environment are the coordinates of the points being illuminated by the particular color of light on the captured image. The identity of the particular landmark can also be determined by examining the color of light being captured on the image. As a result, the 2D coordinates and the identity of each landmark can be automatically extracted from the location and color of each illumination point on the captured images. As the annotation for the landmarks is performed automatically by emitting a predetermined color of light, a high throughput annotation of visual data for training a neural network for landmark detection can be achieved.

Moreover, the camera 14 also takes an image (light-off frame) of the particular landmark on the object when the particular landmark is not illuminated. The extracted 2D coordinates and identity of the landmark are paired with the corresponding light-off frame to form a training dataset for landmark detection.

Figure 2:
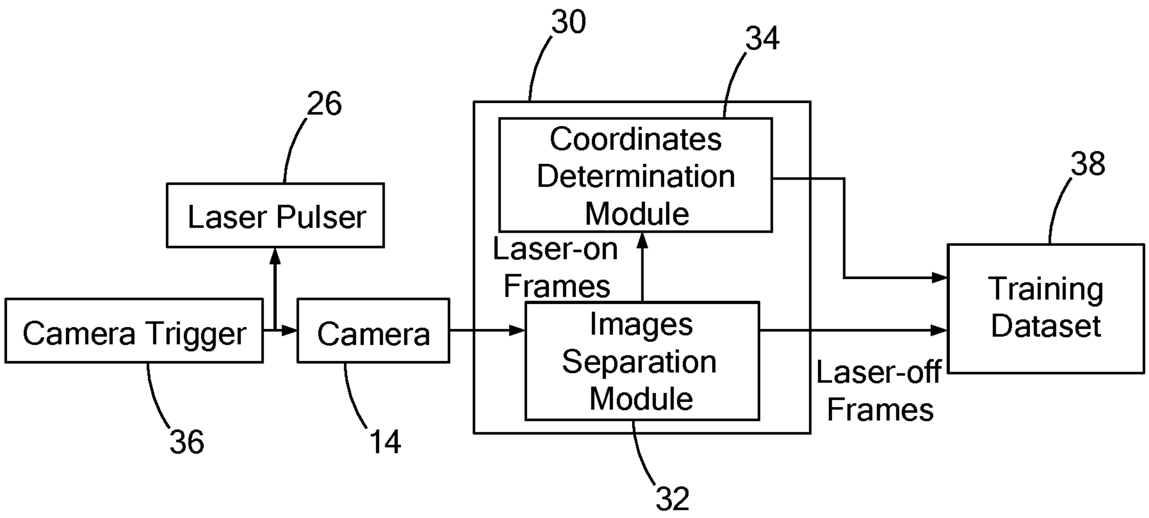
FIG. 2 is a processing module for acquiring and processing visual data in accordance with the teachings of the present disclosure.

Referring to FIG. 2, the processing module 30 is configured to processing visual data, i.e., images, captured by the camera 14 and output training data to a training dataset 38. The processing module 30 includes an images separation module 32 and a coordinates determination module 34.

A camera trigger 36 may be synchronized with the laser pulsers 26 to capture images of the object 14. Therefore, when the laser pulsers 26 are actuated to emit lights, the camera trigger 36 simultaneously triggers the camera 36 to capture images of the object 16. The camera 14 captures first images (i.e., laser-on frames) of the object 16 when any of the landmarks are illuminated by the laser pulsers 26.

Moreover, the camera trigger 36 also triggers the camera 16 to capture second images (i.e., light-off frames) as soon as the laser pulsers 26 stop emitting lights. The second images are taken when no landmarks are illuminated. As an example, the lasers may pulse on every other captured frame. Therefore, the captured images alternate between first images having the landmarks in the camera field of view illuminated by the lights and second images where none of the landmarks are illuminated. In another form, if the lighting system 18 does not include laser pulsers, the lighting system 18 may be actuated to emit lights and deactivated to stop emitting lights, and the camera trigger may be synchronized with actuation and deactivation of the lighting system 18 in order to obtain first images (light-on frames) and second images (light-off frames).

Both first and second images are sent to the processing module 30 for further processing. The images separation module 32 of the processing module 30 is configured to receive both the first and second images, separate the first images from the second images, and send only the first images to the coordinates determination module 34. The coordinates determination module 34 determines 2D coordinates of the plurality of landmarks based on the first images. As previously set forth, the first images are taken when a particular laser beam is on. The first images are annotated by different colors of lights, which help identify what a particular landmark is illuminated on each of the first images. Therefore, the 2D coordinates and the identity of each landmark can be automatically extracted by the coordinates determination module 34 from the location and color of each illumination point on the captured first images.

The images separation module 34 outputs the second images to the training dataset 38. The coordinates determination module 34 outputs the extracted 2D coordinates of the plurality of landmarks and the identity of the landmarks to the training dataset 38, where the extracted 2D coordinates and identity of the associated landmarks are paired with the second images to form training data for machine learning.

Figure 3:
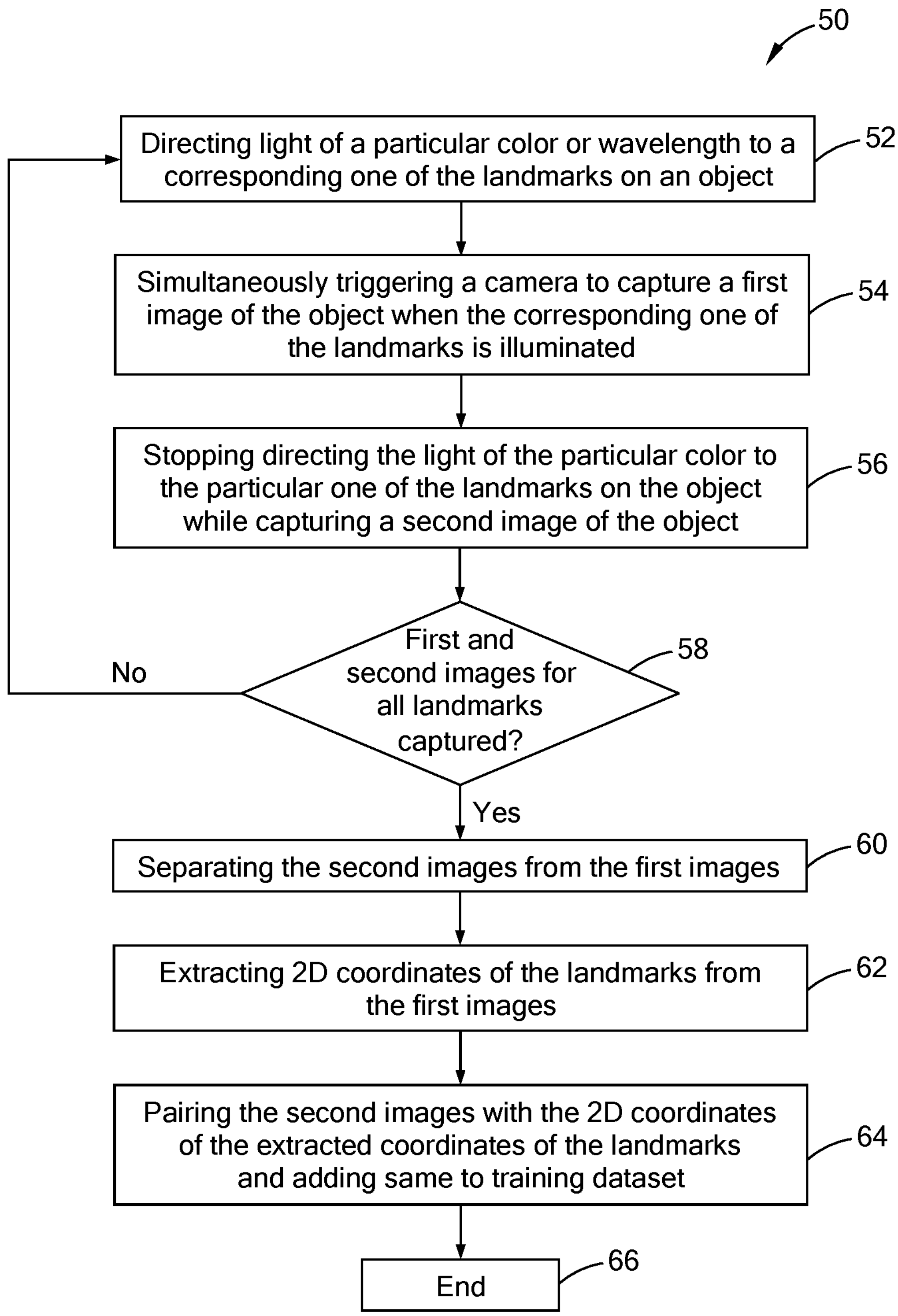
FIG. 3 is a flow diagram of a method of acquiring and processing visual data in accordance with the teachings of the present disclosure.

Referring to FIG. 3, a method 50 of acquiring and processing visual data in accordance with the teachings of the present disclosure starts with directing light of a particular color or wavelength to a corresponding one of the landmarks on an object in step 52. The lighting system includes a plurality of lights of different colors/wavelengths corresponding to the plurality of landmarks on the object. Each landmark is color-coded with a different color of light. The light from the lighting system may be in the visible spectrum or invisible spectrum.

When the corresponding one of the landmarks is illuminated, the camera 14 is simultaneously triggered to capture a first image of the object in step 54. During the visual data capturing, the camera 14 is moved around by the movable platform 24 to cover all the possible perspectives of various components and their corresponding landmarks.

Next, the light is off and stops illuminating the particular one of the landmarks while the camera 14 is triggered to take a second image of the object in step 56. Therefore, a second image (laser-off frame) of the object 16 with the particular landmark not being illuminated is also captured. The timing of the light-on camera trigger is close enough to the timing of the corresponding light-on camera trigger such that the difference between the two frames (light-on and light-off frames) caused by the motion of the camera is negligible for neural network training purposes. This can be achieved by using a high frame-rate camera to ensure that the time lag between the two consecutive frames is minimal. Steps 52 to 56 may be repeated to capture images of a particular landmark visualized from different perspectives.

After the first and second images of the object for a particular landmark are captured, the method goes back to step 52 to continue capturing first and second images of the object with another or remaining landmarks being illuminated by a light of different color/wavelength. When it is determined that all landmarks have been illuminated one by one (or simultaneously) and the first and second images for each of the landmarks have been captured in step 58, the first images (images with landmarks being illuminated) and the second images (no landmark is illuminated) are sent to the images separation module 32 where the second images are separated from the first images in step 60.

The first image is sent to the coordinates determination module for further processing. The 2D coordinates of the plurality of landmarks are extracted from the first images in step 62. The color-coding of the laser pulsers can be used to distinguish each landmark and determine the identify of each landmark. The 2D coordinates and identity of the particular landmark are paired with the next available light-off frame (i.e., second image) and are added to the training dataset in step 64. The method ends in step 66.

It is understood that in another form of the present disclosure, the step of capturing first and second images, the step of separating the second images from the first images, the step of extracting 2D coordinates of the landmarks from the first images may be performed at the same time, without waiting until after all the landmarks are illuminated and their images are taken. In other words, the first and second images for a particular landmark may be sent to the images separation module 32 for separation and the coordinates determination module 34 may extract the coordinates of the particular landmark to form the training data while another landmark is being illuminated and its images are taken.

Alternatively, while not shown in the drawings, it is understood that all of the landmarks may be illuminated simultaneously by different colors of lights if the lighting source has a plurality of laser pointers to allow for emitting of different colors of lights simultaneously. Therefore, there is no need to illuminate the landmarks one by one, thereby saving the time to obtain coordinates of all of the landmarks and form the training data.

In summary, the camera 16 is operated to capture a first image of the object with the light emitting (i.e., light-on frame) and a second image of the object without light emitting (i.e., light-off frame) for each of the landmarks. As the camera moves, the vision system captures images where some are tagged by different colors of lights and others are normal images without any lighting. All such images are gathered into a processing module for further post-processing. The first images are processed to extract the 2D coordinates and the identity of the landmarks. The extracted 2D coordinates and the identified landmarks are paired with their corresponding light-off frames to form a training dataset for machine learning.

The camera takes images of a landmark when the lights are on and off so that the visual data used for machine learning is not affected by the light illumination. Only the first images are used to provide the coordinates of the landmarks with respect to the vision system. Each image serves to impart different data to the training dataset. The light-on images (i.e., the first images) are used to extract coordinates and identity information, whereas the light-off images (i.e., second images) are used for machine learning because, in normal training, the images should not be affected by the light illumination.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method of acquiring and processing visual data, comprising:

directing a light of a particular color to at least one of the plurality of landmarks on an object to illuminate the at least one of the plurality of landmarks such that the at least one of the plurality of landmarks is marked by the particular color to be distinguishable from remaining portions of the object;

obtaining a first image of the object when the at least one of the plurality of landmarks on the object is illuminated;

obtaining a second image of the object right after the at least one of the plurality of landmarks stops being illuminated; and extracting coordinates of the at least one of the plurality of landmarks from the first image.

2. The method according to claim 1, where the extracting coordinates of the at least one of the plurality of landmarks from the first image is performed by a coordinates determination module.

3. The method according to claim 2, wherein the coordinates of the at least one of the plurality of landmarks are obtained based on locations of illumination points on the first image.

4. The method according to claim 1, further comprising extracting identity of the at least one of the plurality of landmarks based on a color of light captured on the first image.

5. The method according to claim 1, further comprising pairing the coordinates of the at least one of the plurality of landmarks with the second image to form a training dataset.

6. The method according to claim 1, further comprising illuminating the plurality of landmarks on the object by a plurality of lights of different colors one by one.

7. The method according to claim 6, wherein each of the plurality of landmarks is associated with a different color of light.

8. The method according to claim 6, further comprising capturing a first image of the object when each of the plurality of landmarks is illuminated.

9. The method according to claim 8, further comprising capturing a second image of the object right after illumination of each of the plurality of landmarks is stopped.

10. The method according to claim 9, wherein the first images and the second images are captured alternately.

11. The method according to claim 10, further comprising separating the first images from the second images by an image separation module.

12. The method according to claim 11, wherein the first images are separated from the second images after the first and second images corresponding to all of the landmarks are captured.

13. The method according to claim 12, further comprising pairing the extracted coordinates with corresponding second images to form a training dataset.

14. The method according to claim 6, wherein the plurality of lights of different colors are pulsed lights.

15. The method according to claim 14, further comprising synchronizing the pulsed lights with a camera trigger that triggers a camera to capture images of the object.

16. The method according to claim 14, further comprising moving and adjusting a lighting system to allow the pulsed lights to be directed to corresponding ones of the landmarks.

17. A method of acquiring and processing visual data, comprising:

directing lights of a plurality of colors to a plurality of landmarks on an object such that each of the plurality of landmarks is marked by a corresponding one of the colors to be distinguishable from remaining portions of the object;

capturing a first image of the object when each of the plurality of landmarks is illuminated;

capturing a second image of the object when each of the plurality of landmarks stops being illuminated;

extracting coordinates of the plurality of landmarks from the first images; and determining identity of each of the landmarks based on the colors of lights being captured on the first images, wherein the second image for each of the plurality of landmarks is paired with the coordinates of each of the plurality of landmarks to form a training dataset.

18. The method according to claim 17, wherein the plurality of lights are generated by laser pulsers, which are triggered on every other camera frame capture.

* * * * *